(No Model.)
W. B. LUCE.
ELECTRIC ARC LAMP.
No. 507,916. Patented Oct. 31, 1893.
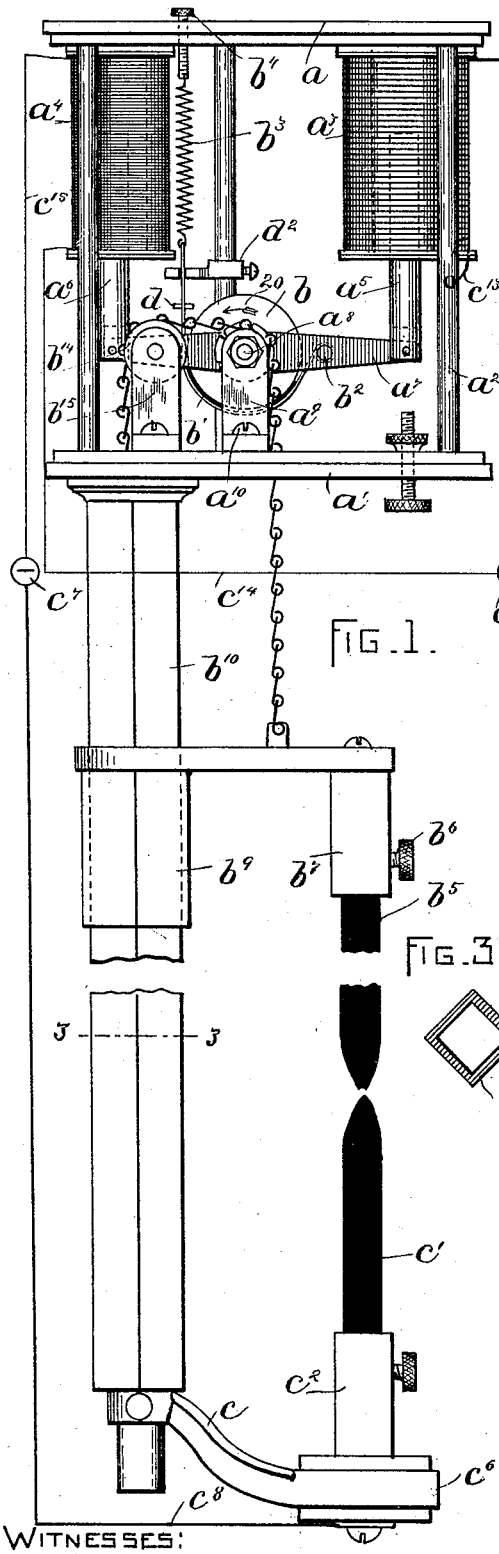
Fig.1.
Fig.3.
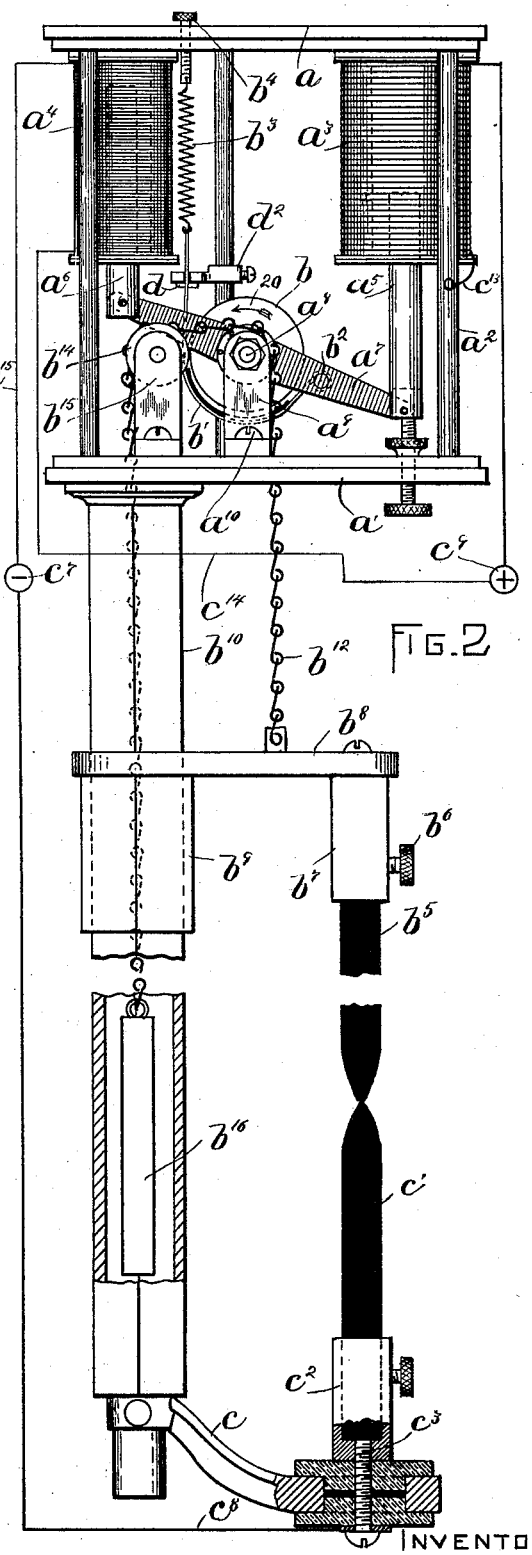
Fig.2.
WITNESSES:
H. A. Hall.
A. D. Harrison.
INVENTOR
W. B. Luce
by Knight Brown Crosby
Attys.

UNITED STATES PATENT OFFICE.

WILLIAM B. LUCE, OF BROOKLINE, MASSACHUSETTS, ASSIGNOR OF ONE-THIRD TO E. S. RITCHIE & SONS, OF SAME PLACE

ELECTRIC-ARC LAMP.

SPECIFICATION forming part of Letters Patent No. 507,916, dated October 31, 1893.

Application filed November 26, 1892. Serial No. 453,204. (No model.)

*To all whom it may concern:*

Be it known that I, WILLIAM B. LUCE, of Brookline, in the county of Norfolk and State of Massachusetts, have invented certain new and useful Improvements in Electric-Arc Lamps, of which the following is a specification.

This invention relates to electric arc lamps and has for its object to provide the same with a feed mechanism of novel construction as will be described, for the upper carbon.

The invention has special reference to a feed mechanism in which a friction mechanism is operatively connected to the upper carbon, so that when the current is established through the lamp, the friction feed mechanism is operated to move the upper carbon in an upward direction and when the resistance in the main circuit becomes abnormal, by reason of an increase in length of arc, the friction mechanism is operated to permit the upper carbon to feed downward to again establish an arc of normal resistance.

The invention consists in the novel features of construction and combinations of parts which will be fully described hereinafter and pointed out in the claims.

Figure 1 represents an elevation partially broken out, of a sufficient portion of an electric arc lamp embodying my invention to enable it to be understood, the friction mechanism being shown in position to establish the arc; Fig. 2 a partial elevation and section of the lamp shown in Fig. 1, the friction mechanism being shown in the position it occupies when the lamp is not in operation, and Fig. 3 a detail to be referred to.

The lamp frame, which may be of any desired or usual construction, is herein shown as composed of a top plate $a$, a bottom plate $a'$ and intermediate rods or standards $a^2$ forming said plates.

The lamp is provided with a low resistance solenoid $a^3$ and a high resistance solenoid $a^4$, having their cores $a^5$ $a^6$ pivotally connected to a lever or walking beam $a^7$ loose on a shaft $a^8$ having bearings in suitable standards or uprights $a^9$, only one of which is shown, the said standards being shown as secured to the bottom plate $a'$ by screws $a^{10}$. The shaft $a^8$ has mounted on it one member of a friction feed mechanism, shown as a disk or wheel $b$, the other member of the said friction feed mechanism being shown as a strap or band $b'$ having one end secured to the lever $a^7$ as at $b^2$ and its other end fastened to one end of a coil spring $b^3$, the other end of which is connected to the top plate $a$, it being shown as fastened to an adjusting screw $b^4$.

The friction feed mechanism is operatively connected to the upper carbon $b^5$ of the lamp as will now be described. The upper carbon $b^5$ is secured as by set screw $b^6$ to a carbon holder, shown as a tubular socket $b^7$, secured to or forming part of an arm or extension $b^8$ of a sliding collar $b^9$ fitted loosely on a column or guide rod or tube $b^{10}$, herein shown as depending from the bottom plate $a'$; the said guide rod or tube $b^{10}$ being preferably made polygonal in shape to prevent the sliding collar $b^9$ from turning on the said rod or tube, thereby insuring correct position of the upper carbon with relation to the lower carbon $c'$. The arm or extension $b^8$ has attached to it one end of a flexible connection such as a chain, cord or rope $b^{12}$ preferably a sprocket chain, which is passed over a sprocket wheel $b^{13}$ on the shaft $a^8$ and preferably over a loose pulley or wheel $b^{14}$ mounted in uprights $b^{15}$ secured to the bottom plate $a'$, the said chain or rope having secured to its other end, a counter balancing weight $b^{16}$, which is suspended within the hollow guide or column $b^{10}$.

The hollow guide or column $b^{10}$ as herein shown has secured to it an arm or extension $c$ to which the holder for the lower carbon $c'$ is secured, the said holder being shown as a tubular socket $c^2$ fastened as by the screw $c^3$ to two disks $c^4$ $c^5$ of insulating material which are fitted into an annular ring or loop $c^6$ on the arm $c$, the screw serving to secure the lower carbon holder $c^2$ and the said disks to the arm $c$ and also to electrically connect the lower carbon holder to the negative binding post $c^7$ of the lamp, the said screw being joined to the said binding post by wire $c^8$. The positive binding post $c^9$ has connected to it one end $c^{10}$ of the coil of the solenoid $a^3$, the other end $c^{12}$ of which is joined to the frame of the lamp, it being shown as connected to one of the rods or standards $a^2$. The positive binding post $c^9$ also has connected to it one end $c^{14}$ of the high resistance coil $a^4$, the other end $c^{15}$ of which is connected to the negative binding post $c^7$.

In operation, the parts of the lamp occupy the position shown in Fig. 2, when the current is cut off from the lamp, but when the current is supplied to the lamp, the core $a^5$ is attracted by its solenoid $a^3$, and the lever $a^7$ is turned on its pivot or shaft $a^8$ and the band or strap $b'$ at the beginning of the movement of the lever $a^7$ is engaged with the disk or wheel $b$, so that, on the continued movement of the core $a^5$ and lever $a^7$, the disk $b$ and its shaft $a^8$ are turned in the direction indicated by arrow 20, and the upper carbon is lifted by the movement of the sprocket wheel assisted by the weight $b^{16}$. When the resistance in the main circuit becomes abnormal, the solenoid $a^4$ becomes active and attracts its core $a^6$, thereby moving the lever back toward its normal position shown in Fig. 2 until a pin or lug $d$ on the strap $b'$ comes in contact with a stop, shown as an arm $d^2$ secured to one of the standards $a^2$, and on the further movement of the lever $a^7$, the friction strap or band $b'$ is removed from engagement with the disk $b$, and the carbon holder is free to descend by gravity to feed the upper carbon toward the lower carbon.

In practice, the action of the friction feed mechanism is substantially sensitive and the arc is maintained substantially constant after it has once been established, whereby a substantially steady light is obtained.

The lamp herein shown may be provided with a cut-out of any usual construction and not herein shown.

By means of the hollow guide rod or tube $b^{10}$ and the weighted flexible chain extended into it, the lamp may be made more compact and the work required of the lamp trimmers lessened by doing away with the usual rod or tube for the upper carbon now commonly found in lamps as now constructed.

I claim—

1. An electric arc lamp, comprising in its construction the following instrumentalities, viz: a low resistance solenoid provided with a core, a high resistance solenoid having a core, a lever pivoted intermediate of its ends and connected on opposite sides of the pivot with said cores respectively, a toothed wheel whose center of rotation is coincident with the fulcrum of the lever, a disk or drum rotatable with said wheel, a movable carbon-holder for the upper carbon, a flexible connection by which the said holder is suspended and which passes over and is engaged by the toothed wheel, and a brake in the form of a strap or band fastened at one end and arranged to engage the periphery of the disk or drum, its other end being connected with the lever, substantially as described.

2. An electric arc lamp, comprising in its construction the following instrumentalities, viz: a low resistance solenoid provided with a core, a high resistance solenoid having a core, a lever pivoted intermediate of its ends and pivotally connected at its ends with said cores respectively, a toothed wheel whose center of rotation is coincident with the fulcrum of the lever, a disk or drum rotatable with said wheel, a movable carbon-holder for the upper carbon, a flexible connection by which the said holder is suspended and which passes over and is engaged by the toothed wheel, a brake in the form of a strap or band connected at one end with a retractor and at the other end with the lever and arranged to engage the periphery of the disk or drum, and a fixed stop for the said band or strap to encounter, substantially as and for the purpose described.

3. An electric-lamp, comprising in its construction a polygonal hollow column or guide-rod, a sliding collar engaging said column and having an arm or extension constructed to hold the upper carbon, and a counter-balancing weight occupying the hollow column and connected with the said arm or extension.

In testimony whereof I have signed my name to this specification, in the presence of two subscribing witnesses, this 19th day of November, A. D. 1892.

WILLIAM B. LUCE.

Witnesses:
C. F. BROWN,
A. D. HARRISON.